United States Patent
Takeda et al.

(10) Patent No.: US 6,757,011 B1
(45) Date of Patent: Jun. 29, 2004

(54) VIBRATION ISOLATOR FOR TV CAMERA

(75) Inventors: Toshiaki Takeda, Omiya (JP); Shinya Yajima, Omiya (JP)

(73) Assignee: Fuji Photo Optical Co., Ltd., Saitama (JP)

(*) Notice: Subject to any disclaimer, the term of this patent is extended or adjusted under 35 U.S.C. 154(b) by 0 days.

(21) Appl. No.: 09/277,772

(22) Filed: Mar. 29, 1999

(30) Foreign Application Priority Data

Mar. 30, 1998 (JP) .......................................... 10-083902

(51) Int. Cl.⁷ ........................ H04N 5/228; H04N 5/225; G03B 17/00
(52) U.S. Cl. ........................ 348/208; 348/373; 348/375; 348/360; 396/52; 396/55; 396/421; 396/422; 396/428
(58) Field of Search ................................ 348/208, 373, 348/360, 345, 208.7, 208.8, 208.11, 375; 396/52–55, 428, 421, 422

(56) References Cited

U.S. PATENT DOCUMENTS

| | | | | |
|---|---|---|---|---|
| 5,444,512 A | * | 8/1995 | Morizumi ..................... | 396/55 |
| 5,587,764 A | * | 12/1996 | Nakamura et al. ............ | 396/55 |
| 5,596,366 A | * | 1/1997 | Takashima et al. ..... | 348/208.16 |
| 5,652,935 A | * | 7/1997 | Kusaka ........................ | 396/428 |
| 5,859,665 A | * | 1/1999 | Hibi ........................ | 348/208.8 |
| 6,208,810 B1 | * | 3/2001 | Imada .......................... | 396/55 |
| 6,343,188 B1 | * | 1/2002 | Morofuji ...................... | 396/55 |

FOREIGN PATENT DOCUMENTS

| | | |
|---|---|---|
| JP | 63-201624 | 8/1988 |
| JP | 64-33519 | 2/1989 |
| JP | 6-189181 | 7/1994 |

* cited by examiner

*Primary Examiner*—Andrew Christensen
*Assistant Examiner*—Nhan Tran
(74) *Attorney, Agent, or Firm*—Birch, Stewart, Kolasch & Birch, LLP

(57) ABSTRACT

An EFP lens device is attached to a mount frame of a lens supporter, and an adapter-type vibration isolator is fixed to the back face of the mount frame. An ENG camera is attached to the back of the vibration isolator. The vibration isolator automatically checks information about the focal length of the attached lens device, information about an extender, etc. and adjusts the amplitude of the correcting lens according to the vibrations of the lens. A lens information setting switch is provided at the vibration isolator so that a user can freely enter and change the lens inherent information through the lens information setting switch. A vibration ON/OFF switch and a sensitivity setting means are provided at a manual control part.

16 Claims, 14 Drawing Sheets

VIBRATION ISOLATOR FOR TV CAMERA

BACKGROUND OF THE INVENTION

1. Field of the Invention

This invention relates generally to a vibration isolator for a TV camera, which prevents an image blur due to vibrations of the TV camera, and more particularly to a vibration isolator for a TV camera, in which a lens device is attached to a body of the TV camera through a lens supporter.

2. Description of Related Art

To attach a box-shaped heavyweight lens device such as an electronic field production (EFP) lens device to the body of a handy TV camera such as an electronic news-gathering (ENG) camera, a lens supporter is fixed to a tripod first. Then, the body of the TV camera is fixed to one side of the lens supporter, and the lens device is fixed to the other side of the lens supporter. Thus, the weight of the lens device is not directly applied to the body of the TV camera.

Some lens devices have a built-in vibration isolator. The vibration isolator has a correcting lens for correcting an image blur. The correcting lens is moved in such a manner as to correct the image blur according to the direction of the vibration, thus acquiring a satisfactory image which is not blurred.

On the other hand, there has been disclosed an adapter-type vibration lens unit which may be separated from the lens device (Japanese Patent Provisional Publication Nos. 63-201624, 64-33519 and 6-189181).

The conventional lens device which has the built-in vibration isolator, however, is very expensive since the vibration isolator must be incorporated into each lens device. In view of the price, it is preferable to use one vibration isolator for different kinds of lens devices. The above-mentioned three Japanese Patent Provisional Publications, however, disclose neither a method of attaching the lens unit to a lens or a camera nor a means for attaching the lens unit to connecting parts (hook mounts), which are different in shape according to the types of the lens or the camera.

According to the adapter-type vibration lens unit (the intermediate adapter) disclosed by Japanese Patent Provisional Publication No. 6-189181, lens inherent information, which is required for controlling the vibration isolation, is transmitted from the lens device. It is, however, impossible to control the vibration isolation if the lens device with no means for transmitting the information is used.

SUMMARY OF THE INVENTION

In view of the foregoing, it is an object of the present invention to provide a vibration isolator for a TV camera, which is attachable to a variety of lens devices regardless of the shape of a hook mount in a lens or a lens supporter, and which makes possible the vibration isolation control even with the use of a lens device which is not provided with a means for transmitting lens inherent information.

To achieve the above-mentioned object, the present invention is directed to a vibration isolator for a TV camera, in which a lens device is attached to a body thereof across a lens supporter, wherein said vibration isolator provided with a correcting lens for correcting an image blur of said TV camera is provided on said lens supporter.

According to the present invention, the vibration isolator is attached to the lens supporter, and the vibration isolator is commonly used for different kinds of lens devices. This eliminates the necessity of providing the lens device with the vibration isolator, thus reducing the cost for manufacturing the lens device.

Preferably, the vibration isolator is an adapter-type vibration isolator detachably attached to the back side of a mount frame of the lens supporter through connecting means. Therefore, the vibration isolator can be attached to the lens supporter regardless of the shapes of the hook mounts of the lens and the lens supporter.

More specifically, the isolator for the TV camera comprises: supporting means for movably supporting the correcting lens within a plane perpendicular to an optical axis; image blur detecting means for detecting an image blur of said TV camera; an arithmetic unit for calculating a correction movement amount for said correcting lens in accordance with information from the image blur detecting means; drive means for moving the correcting lens in such a direction as to correct the image blur in accordance with information from the arithmetic unit; position detecting means for detecting the position of the correcting lens; and control means for feedback-controlling the drive means so that the correcting lens can be moved by the correction movement amount calculated by the arithmetic unit in accordance with the position of the correcting lens detected by the position detecting means.

In one form, said vibration isolator includes amplitude adjusting means for adjusting the amplitude of the correcting lens for each lens device in accordance with lens information transmitted from each lens device. The lens information relates to, for example, the magnification of the lens, the focal length, the extender, the lens code, or the like, which are required for controlling the vibration isolation. The amplitude adjusting means enables the vibration isolator to properly control the vibration isolation by automatically checking the information relating to the attached lens device.

According to the present invention, the vibration isolator includes information input control part for setting lens information in accordance with the operation of a user in the case that the lens device has no means for transmitting its lens information. The user can freely enter or change the lens information through the information input control part. This allows the vibration isolator to properly control the vibration isolation even if it receives no lens information from the lens device.

In accordance with an alternate embodiment of the present invention, said vibration isolator includes a remote control part provided with a vibration isolation ON/OFF control means for determining whether to operate a vibration isolating function of said vibration isolator and/or a sensitivity adjustment control means for adjusting the sensitivity of the image detecting means for detecting the image blur of said TV camera. Therefore, the cameraman can easily select the ON/OFF of the vibrating function and adjust the sensitivity by operating the remote control part at hand. In addition, the vibrations due to the operation are not transmitted to the lens device.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

This invention will be described in further detail by way of example with reference to the accompanying drawings.

Figure 1:
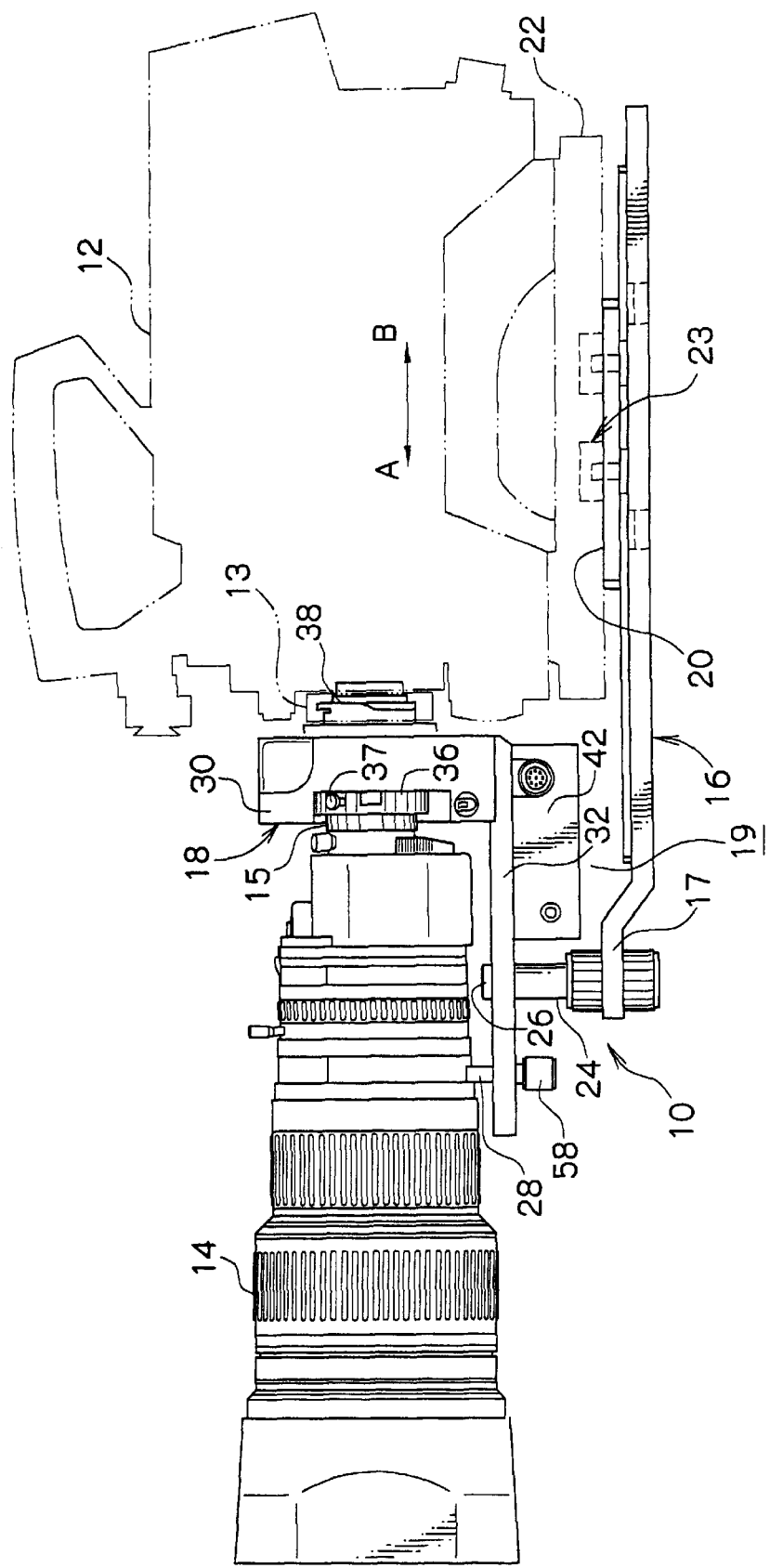
FIG. 1 is a view showing the whole studio camera unit to which a vibration isolator for a TV camera according to the present invention is applied.

FIG. 1 shows a preferred embodiment of a studio camera unit 10, which includes a vibration isolator for a TV camera according to the present invention.

As shown in FIG. 1, the studio camera unit 10 is constructed in such a way that a screen-shaped lens supporter 16 is fixed to a tripod head 14 of a tripod 12 and an ENG camera (hereafter referred to as a camera) 18 is supported at the right side of a mount frame 17 of the lens supporter 16 through a vibration isolator 20. An EFP lens device 22 is supported at the left side of the mount frame 17 in FIG. 1. Reference numeral 16A in FIG. 1 indicates a height adjustment control for adjusting the height of the camera 18.

Figure 2:
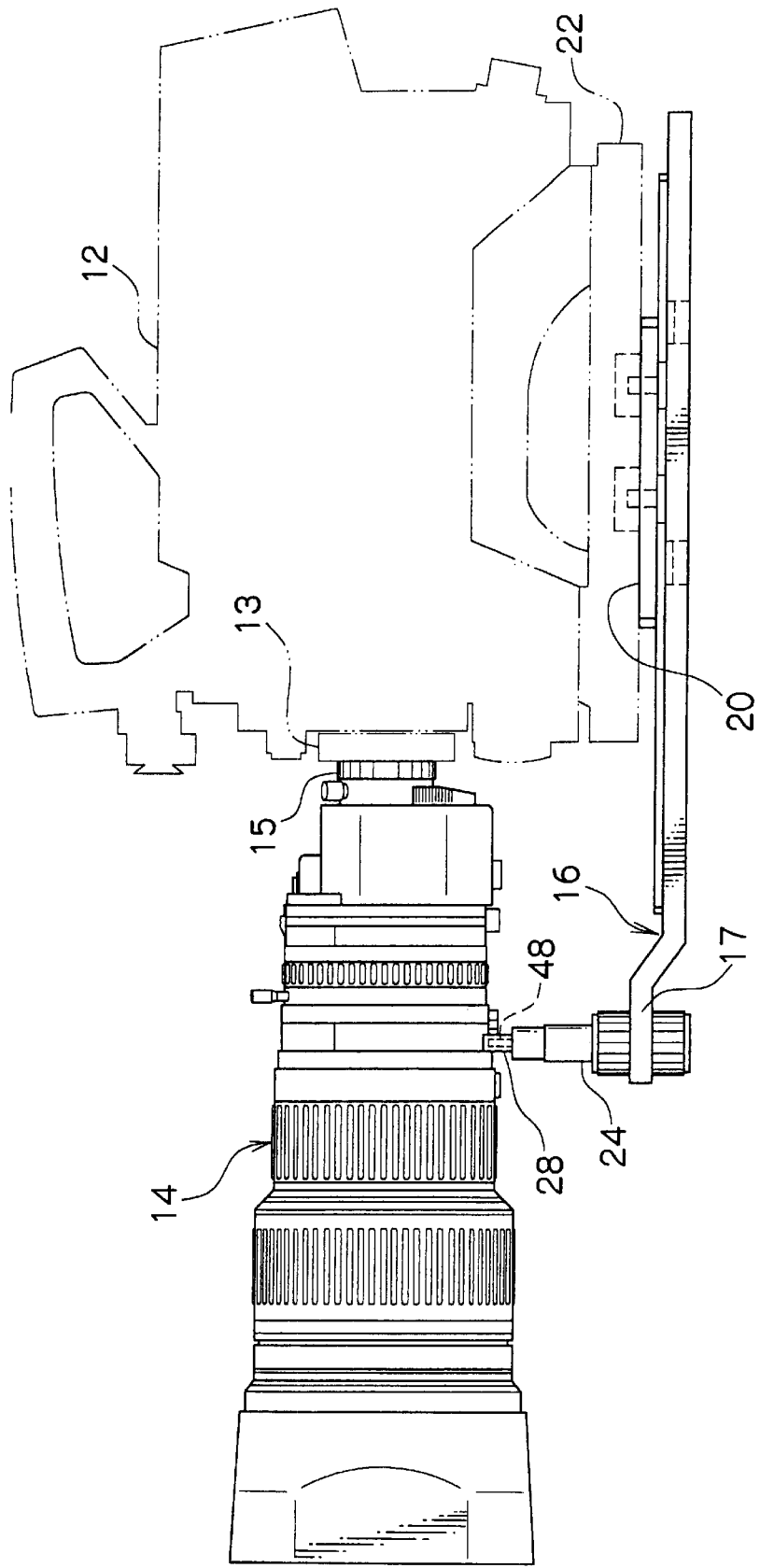
FIG. 2 is a partially-broken enlarged view showing the state wherein a lens supporter supports a camera and a lens device.
Figure 3:
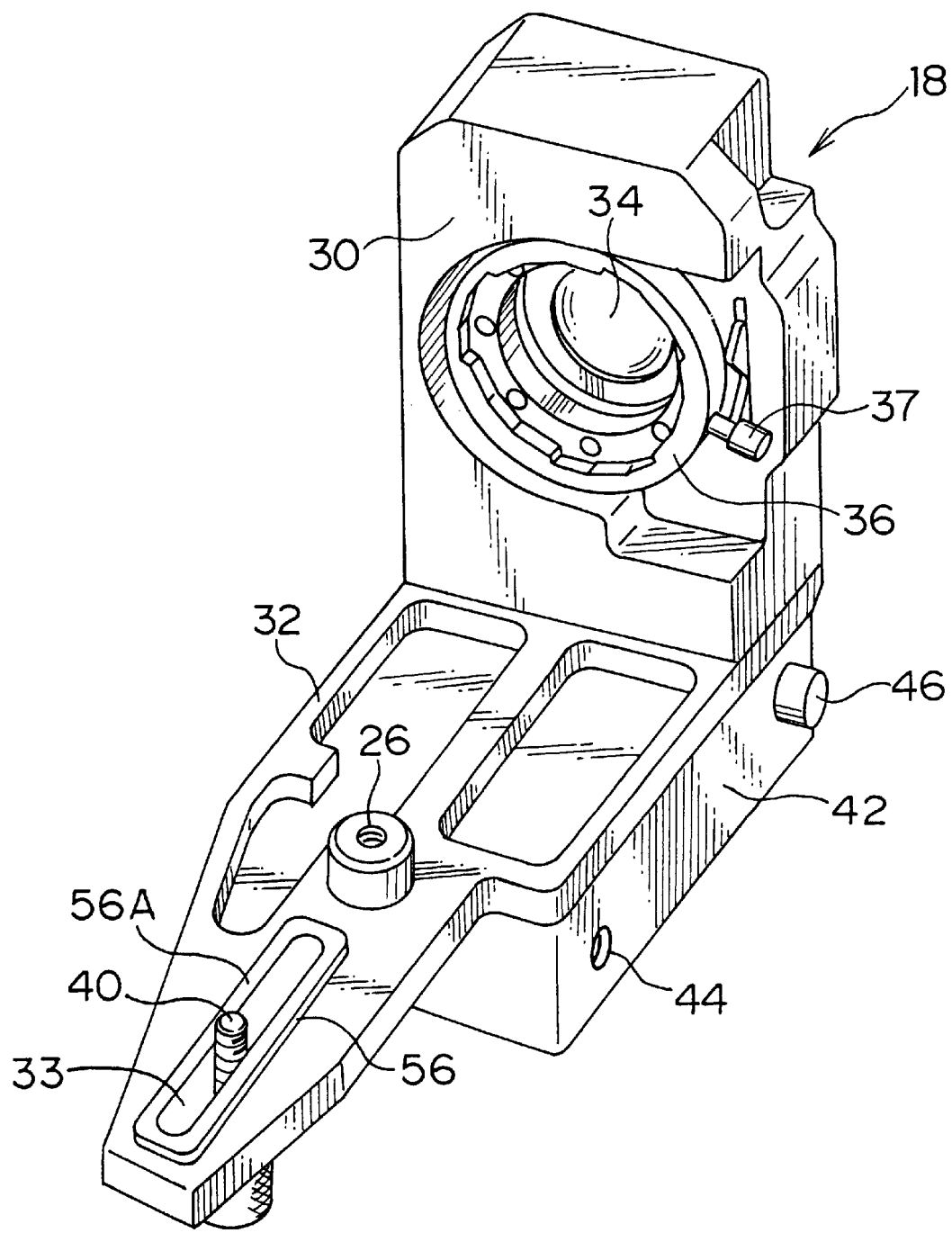
FIG. 3 is an enlarged sectional view showing the structure for supporting a vibration isolator on the lens supporter.

As shown in FIGS. 2 and 3, a hook 24 is formed at the back face of the lens device 22. The hook 24 is put in a hook 26 formed at the front side of the mount frame 17, and therefore, the lens device 22 is supported in the state of hanging on to the lens supporter 16. As shown in FIG. 2, a lens mount 23 at the back end of the lens device 22 is arranged through an opening 17A formed in the mount frame 17 of the lens supporter 16. The lens mount 23 is inserted into a ring 21A provided at the right side of the vibration isolator 20 in FIG. 2. A mount 21B is provided at the right side of the vibration isolator 20 in FIG. 2, and a mount 19 of the camera 18 connects to the mount 21B. Consequently, the camera 18 and the lens device 22 are supported by the lens supporter 16 and the vibration isolator 20 in the state wherein the optical axes of the camera 18 and the lens device 22 correspond to one another.

Figure 4:
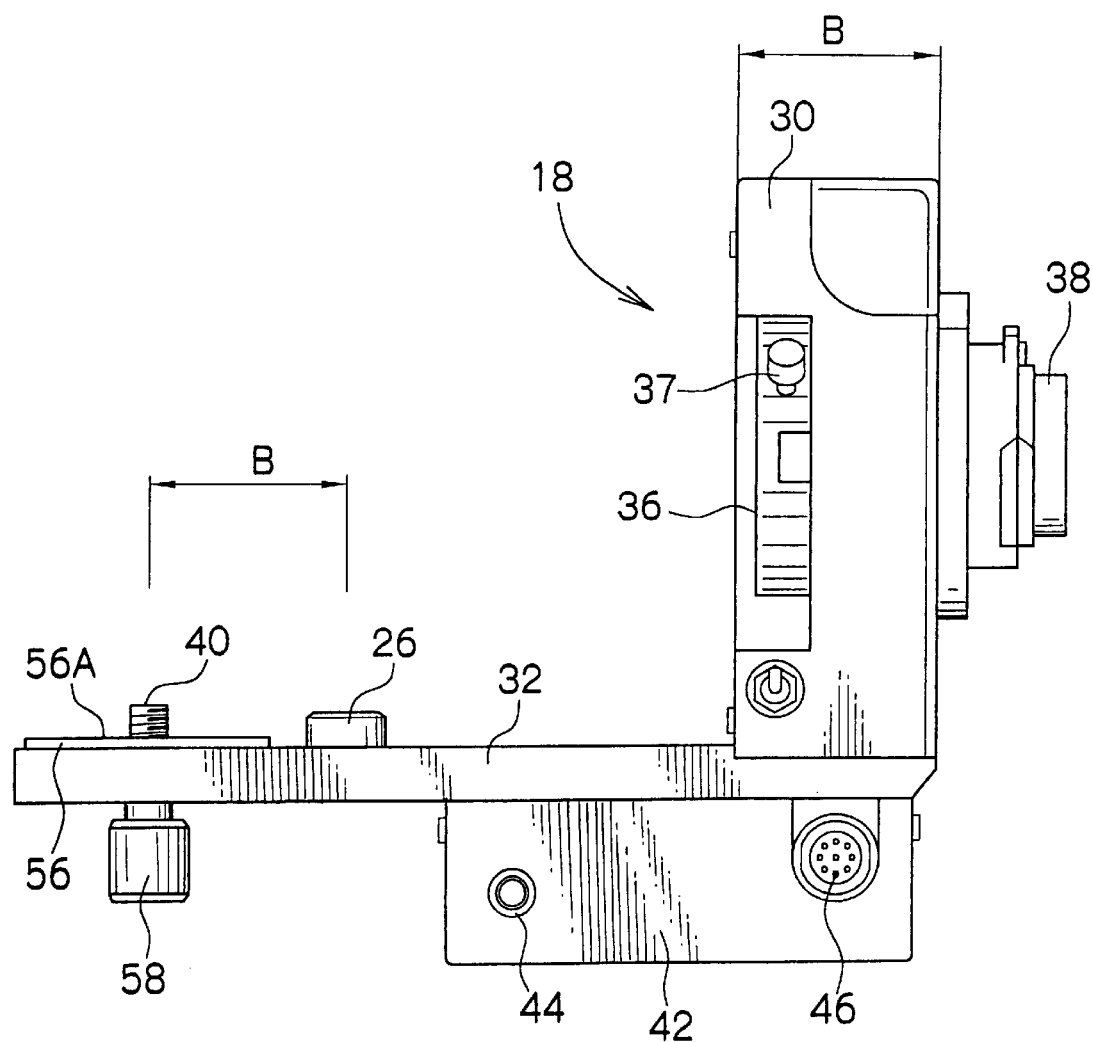
FIG. 4 is an enlarged sectional view showing the state wherein a vibration isolator is attached to the lens supporter.

FIG. 4 is a sectional view showing the essential parts of the structure of the vibration isolator 20 attached to the lens supporter 16. FIG. 4 shows the state before the vibration isolator 16 is attached to the lens supported 16. As shown in FIG. 4, a tapped hole 27 is formed in a boss 28, which projects horizontally from the back face of the mount frame 17 of the lens supporter 16.

On the other hand, a cylindrical casing 30 is formed in the vibration isolator 20, and the boss 28 is inserted into the casing 30. A screw 32 is provided inside the casing 30 and is screwed into the tapped hole 27. The screw 32 connects to a control 34 through a hole 33 formed in the casing 30. The screw 32 is screwed into the tapped hole 27 while the control 34 is rotated. As a result, the boss 28 is fixed within the casing 30. Consequently, the vibration isolator 20 is positioned and attached to the lens supporter 16.

Figure 5:
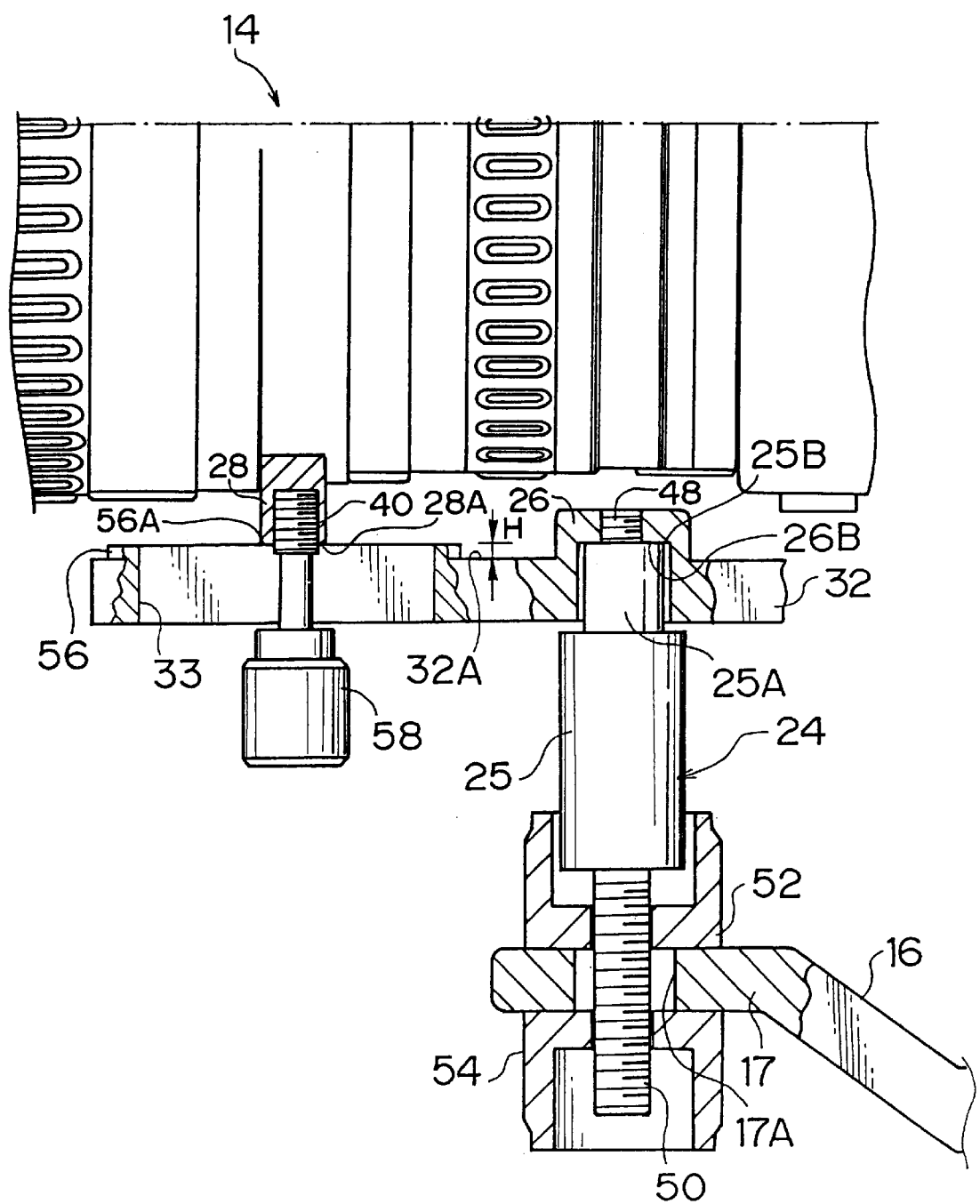
FIG. 5 is a plan view showing the structure for attaching the vibration isolator to the lens supporter.

As shown in FIG. 5, the casing 30 projects at the upper left of a body 21 of the vibratin isolator 20. A casing 35A with a slit 36A projects at the lower left of the body 21 in FIG. 5. A boss 28A, which projects from the lens supporter 16 and is shaped in the same way as the boss 28 in FIG. 4, is inserted into the slit 36A of the casing 35A. A screw is provided inside the casing 35A, and a control connects to the screw. Rotating the control fastens the boss 28A in the casing 35A. The screw and the control are omitted in FIG. 5.

Additionally, casings 35B, 35C project at the upper and lower right of the body 21 in FIG. 5. Bosses 28B, 28C which are shaped in the same way as the boss 28 in FIG. 4, are loosely inserted into holes 36B, 36C of the casings 35B, 35C. Then, the bosses 28B, 28C are fastened in the casings 35B, 35C with screws. The screws and controls for the casings 35B, 35C are omitted in FIG. 5.

Figure 6:
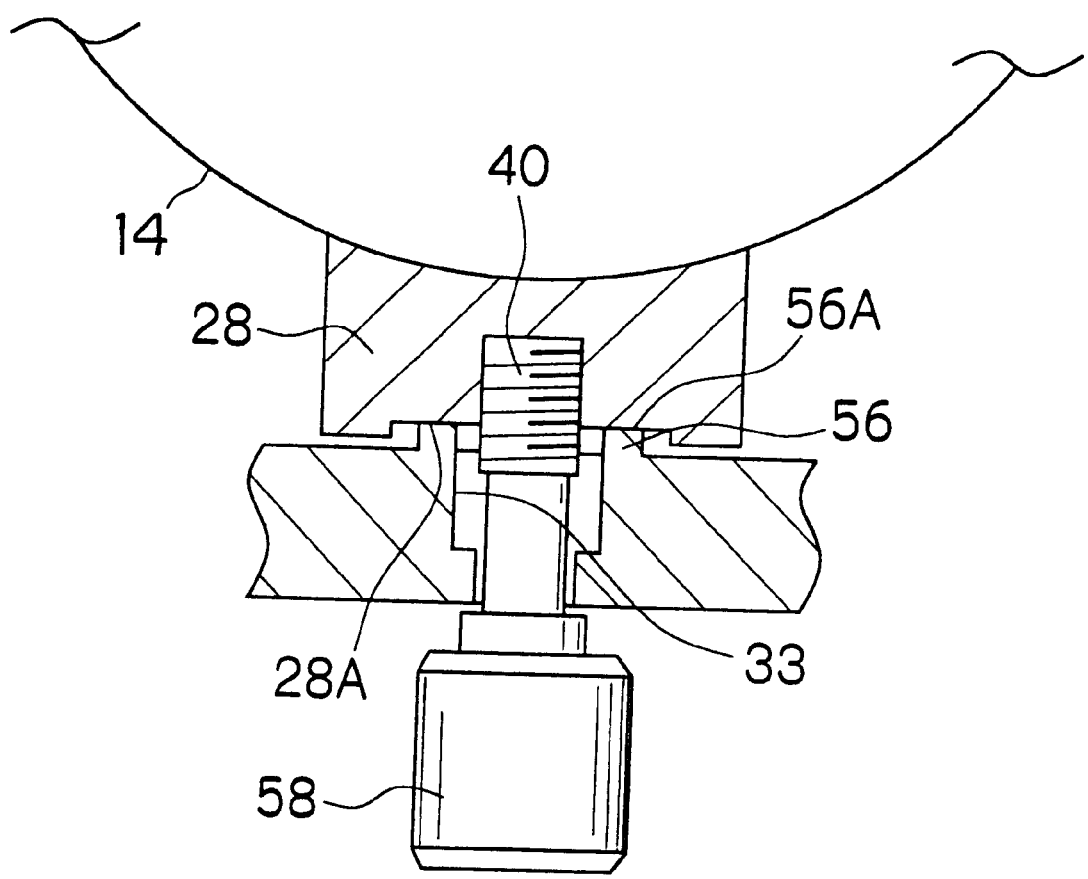
FIG. 6 is a view showing the structure for supporting a correcting lens built in the vibration isolator.

FIG. 6 is a front view showing the structure for supporting a correcting lens 40 built in the vibration isolator 20. As shown in FIG. 6, the correcting lens 40 is held on a lens frame 42 and is arranged in the body 21 of the vibration isolator 20. Linear motors 44, 46 move the correcting lens 40 in a direction to correct the blur of an image on a plane perpendicular to an optical axis L. The correcting lens 40 is movably supported at the body 21 through a parallel link mechanism composed of four arms 48, 50.

The linear motor 44 moves the correcting lens 40 horizontally in FIG. 6, and it is composed of a motor body 44A and a rod 44B. The motor body 44A is fixed to the body 21, and the end of the rod 44B is inserted into a slot 52 of the lens frame 42 through a roller. The slot 52 is vertically formed at the left side of the lens frame 42, and the roller 54 is vertically movable relative to the slot 52.

Figure 7:
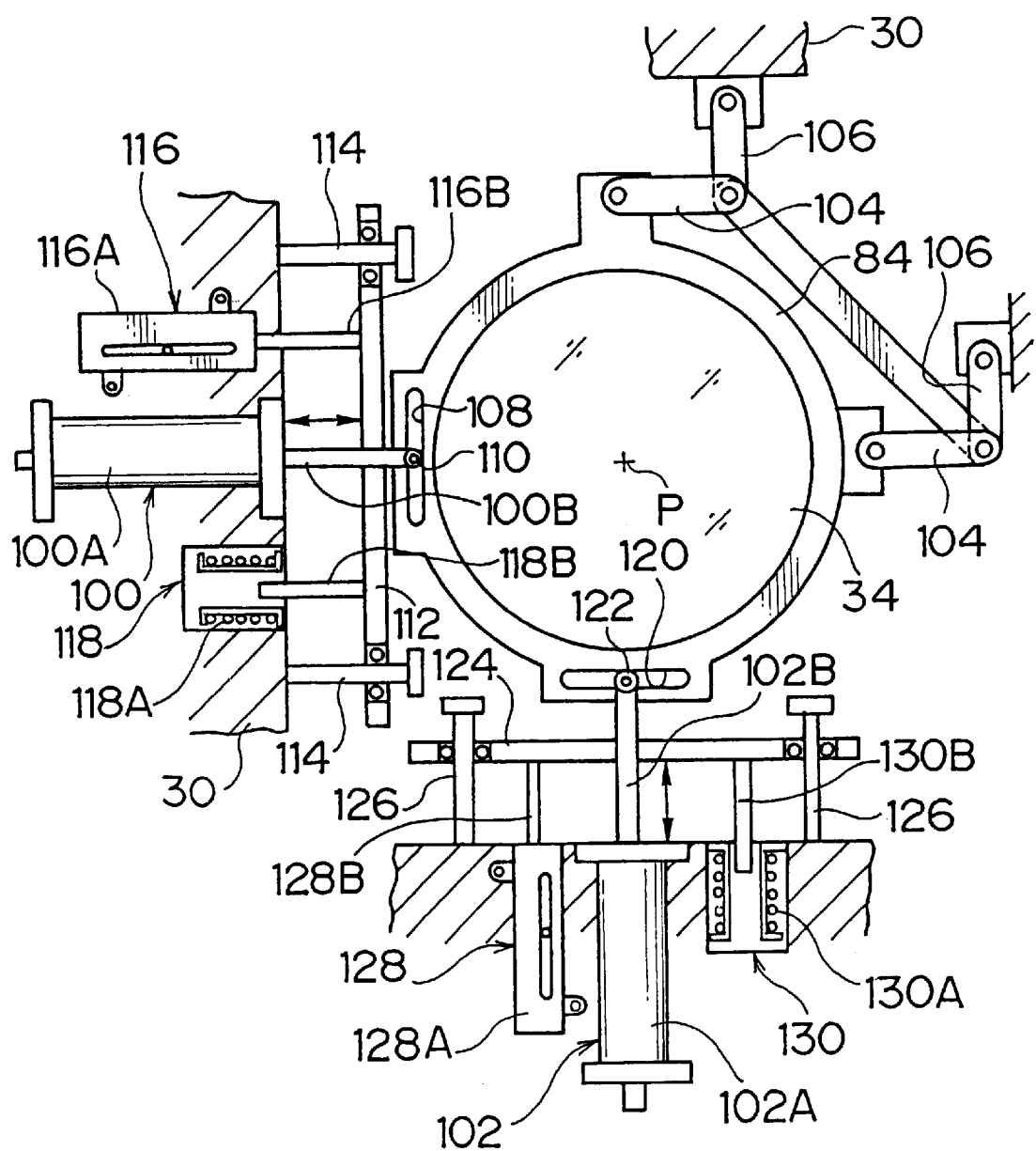
FIG. 7 is an explanatory drawing showing the horizontal movements of the correcting lens.

When the driving force of the motor body 44A extends and contracts the rod 44B, the rod 44B presses or pulls the correcting lens 40 horizontally in FIG. 7. When a force is vertically applied to the lens frame 42 in FIG. 6, the correcting lens 40 moves vertically with the slot 52 being guided by the roller 54.

A connecting frame 56 connects to the rod 44B of the linear motor 44. The connecting frame 56 extends vertically in FIG. 6, and the rod 44B is secured to the center of the connecting frame 56. The top and bottom ends of the connecting frame 56 are slidably supported on linear guides 58, which are parallel with the rod 44B. With the extension and contraction of the rod 44B, the connecting frame 56 moves horizontally with its position being maintained.

The end of a detecting contact needle 60B of a position sensor 60 is pressed against the connecting frame 56. A sensor body 60A of the position sensor 60 is fixed to the body 21 so that the detecting contact needle 60B can be parallel to the rod 44B. The position sensor 60 detects the moving amount of the connecting frame 56, which moves parallel in accordance with the extension and contraction of the rod 44B.

According to the position sensor 60 of this embodiment, the detecting contact needle 60B is not in contact with the peripheral surface of the lens frame 42, but in contact with the connecting frame 56 so as to indirectly detect the moving length of the correcting lens 40. As stated previously, the connecting frame 56 moves parallel with its position being maintained regardless of the extending and contracting amount of the rod 44B. For this reason, the detecting contact needle 60B does not slip off from the moving connecting frame 56.

Reference numeral 62A indicates a bobbin of a speed generator 62, and reference numeral 62B indicates a core of the speed generator 62. The core 62B is secured to the connecting frame 56.

On the other hand, the linear motor 46 moves the correcting lens 40 vertically in FIG. 6, and it is composed of a motor body 46A and a rod 46B. The motor body 46A is fixed to the body 21, and the end of the rod 46B is inserted into a slot 64 of the lens frame 42 through a roller 66. The slot 64 is formed horizontally at the lower part of the lens frame 42 as shown in FIG. 6, and the roller is movable horizontally relative to the slot 64.

Figure 8:
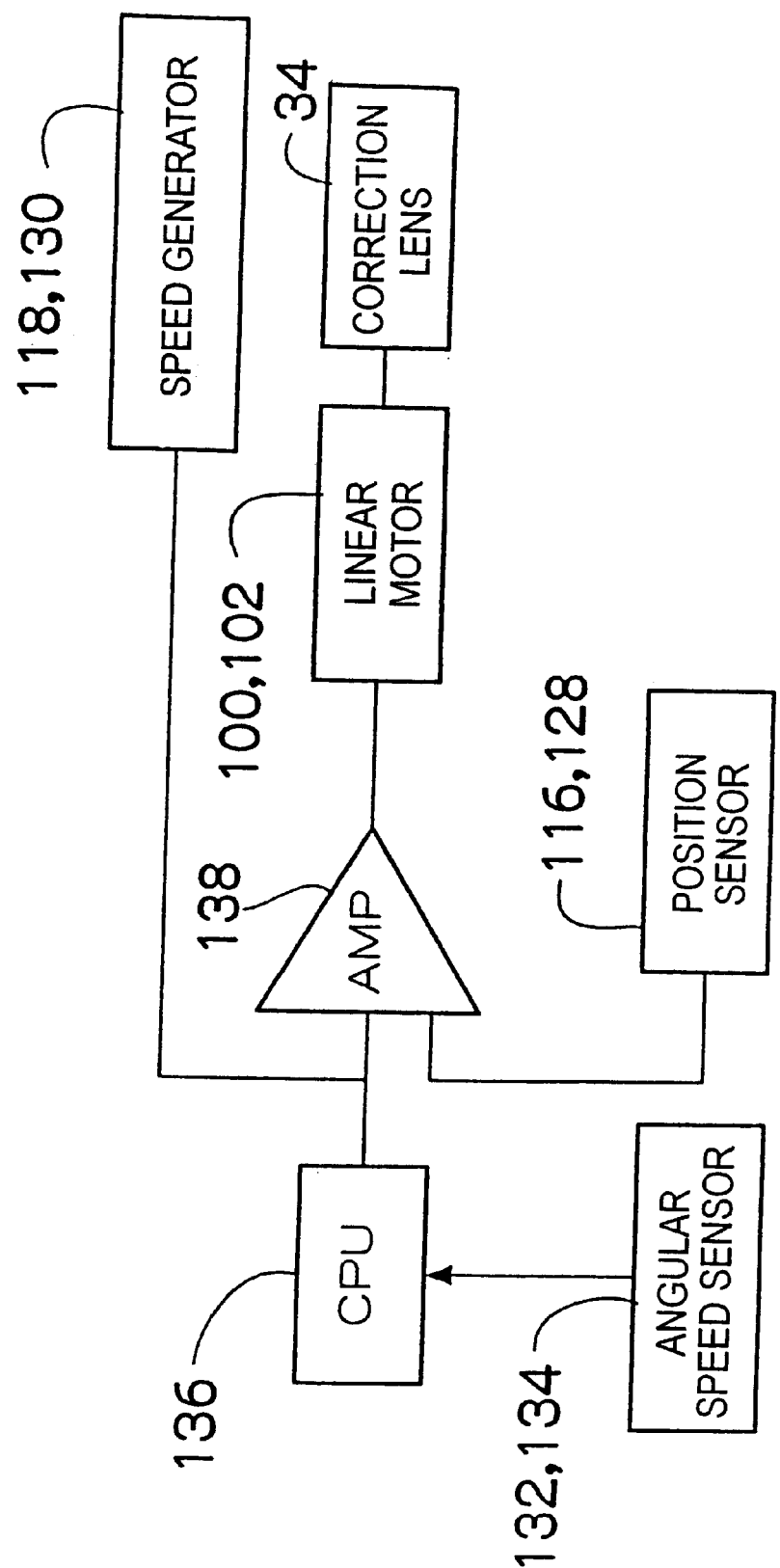
FIG. 8 is an explanatory drawing showing the vertical movements of the correcting lens.

When the driving force of the motor body 46A extends and contracts the rod 46B, the rod 46B presses or pulls the lens frame 42 vertically in FIG. 8. When a force is applied to the lens frame 42 horizontally in FIG. 6, the correcting lens 40 moves horizontally with the slot 64 being guided by the roller 54.

A connecting frame 68 connects to the rod 46B of the linear motor 46. The connecting frame 56 extends horizontally in FIG. 6, and the rod 46B is secured to the center of the connecting frame 56. The right and left ends of the connecting bar 68 are slidably supported on linear guides 70, which are parallel with the rod 46B. With the extension and contraction of the rod 46B, the connecting frame 68 moves vertically with its position being maintained.

The end of a detecting contact needle 72B of a position sensor 72 is pressed against the connecting frame 68. A sensor body 72A of the position sensor 72 is fixed to the body 21 so that the detecting contact needle 72B can be parallel to the rod 46B. The position sensor 72 detects the moving amount of the connecting frame 68, which moves parallel in accordance with the extension and contraction of the rod 46B.

According to the position sensor 72 of this embodiment, the detecting contact needle 72B is not in contact with the peripheral surface of the lens frame body 42, but in contact with the connecting frame 68 so as to indirectly detect the moving length of the correcting lens 40. As stated previously, the connecting frame 68 moves parallel with its position being maintained regardless of the extending and contracting amount of the rod 46B. For this reason, the detecting contact needle 72B does not slip off from the moving connecting frame 68.

Reference numeral 74A indicates a bobbin of a speed generator 74, and reference numeral 74B indicates a core of the speed generator 74. The core 74B is secured to the connecting frame 68.

Figure 9:
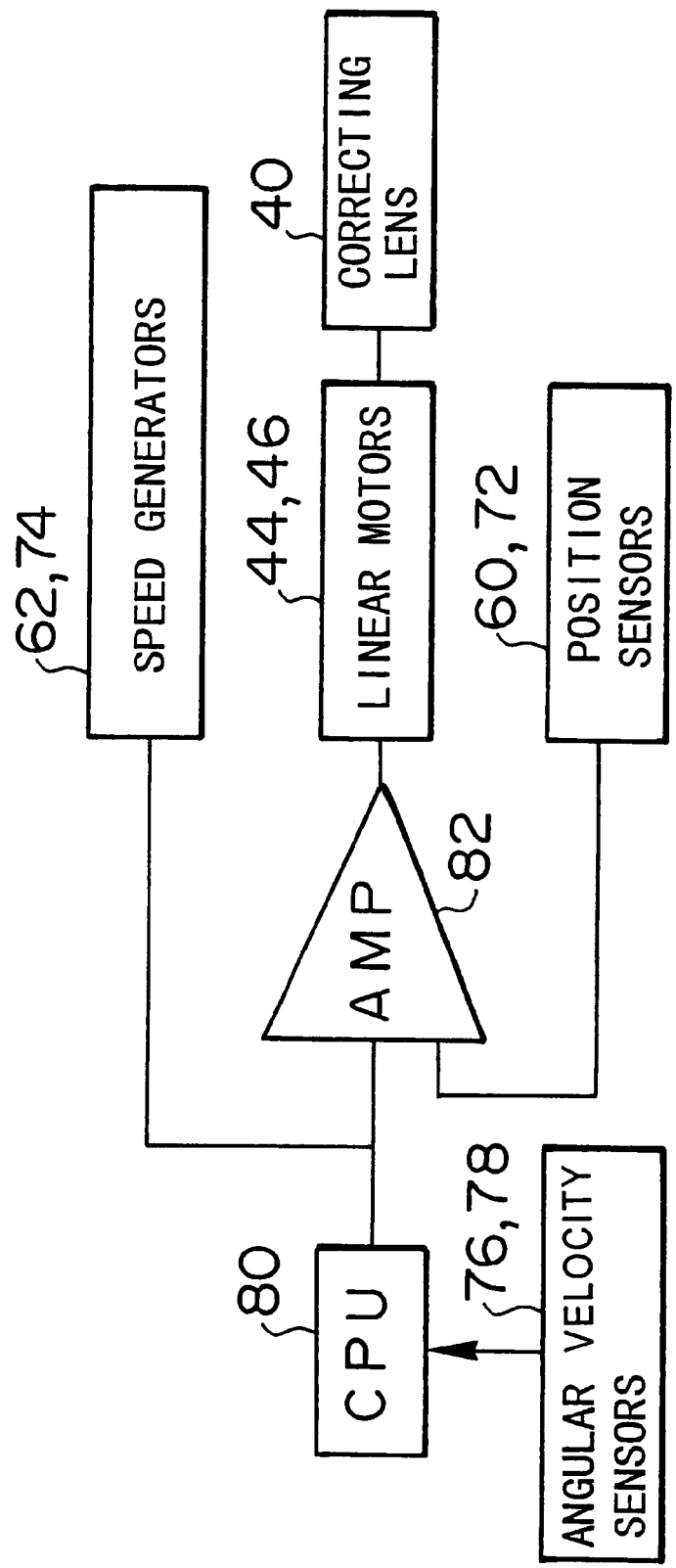
FIG. 9 is a block diagram showing a control system for the vibration isolator in FIG. 6.

FIG. 9 is a block diagram illustrating a drive control system for the correcting lens 40 in the vibration isolator 20. Angular velocity sensors 76, 78 in FIG. 9 are arranged in the camera 18 or in the vibration isolator 20. For example, one angular velocity sensor 76 is provided at the side of the camera 18, and the other angular velocity sensor 78 is provided at the top of the camera 18.

The angular velocity sensor 76 detects the horizontal vibrations in the vibrations transmitted to the camera 18. The obtained information is output to a central processing unit (CPU) 80. The CPU 80 calculates the horizontal correction movement amount for the correction lens 40 in accordance with the information obtained from the angular velocity sensor 76. An amplifier 82 amplifies a signal indicating the horizontal correction movement amount, and the signal is output to the linear motor 44 (see FIG. 6). The linear motor 44 extends or contracts the rod 44B in accordance with the signal from the CPU 80.

On the other hand, the angular velocity sensor 78 detects the vertical vibrations in the vibrations transmitted to the studio camera unit 10. The obtained information is output to the CPU 80. The CPU 80 calculates the vertical correction movement amount for the correcting lens 40 in accordance with the information from the angular velocity sensor 78. An amplifier 82 amplifies a signal indicating the vertical correction movement amount, and the signal is output to the linear motor 46. The linear motor 46 extends or contracts the rod 46B in accordance with the signal from the CPU 80.

According to the vibration isolator for the TV camera, the CPU 80 receives the information on the horizontal vibrations from the angular velocity sensor 76, and the CPU 80 calculates the horizontal correction movement amount for the correcting lens 40, and outputs the signal indicating the horizontal correction movement amount to the linear motor 44. The linear motor 44 extends or contracts the rod 44B in accordance with the signal from the CPU 80, and moves the correction lens 40 to such a position as to correct the image blur. Consequently, the movement of the correcting lens 40 offsets the horizontal vibrating components to thereby correct the image blur in a horizontal direction.

While the correcting lens 40 is moving horizontally, the position sensor 60 detects the moved position of the connecting frame 56. The position signal detected by the position sensor 60 is compared with the signal indicating the correction moving amount, which is output from the CPU 80. The CPU 80 feedback-controls the linear motor 44 so that the correcting lens 40 can be moved by the correction movement amount.

On the other hand, when the CPU 80 receives the information on the vertical vibrations from the angular velocity sensor 78, the CPU 80 calculates the vertical correction movement amount for the correcting lens 40, and outputs the signal indicating the vertical correction movement amount to the linear motor 46. The linear motor 46 extends or contracts the rod 46B in accordance with the signal from the CPU 80, and moves the correcting lens 40 to such a position as to correct the image blur. Consequently, the movement of the correcting lens 40 offsets the vertical vibrating components to thereby correct the image blur in a vertical direction.

While the correcting lens 40 is moving vertically, the position sensor 72 detects the moved position of the connecting frame 68. The position signal detected by the position sensor 72 is compared with the signal indicating the correction moving amount, which is output from the CPU 80. The CPU 80 feedback-controls the linear motor 46 so that the correcting lens 40 can be positioned correspondingly to the correction movement amount.

The interior of the vibration isolator 20 is not necessarily structured as shown in FIG. 6. A variety of drive means other than the actuator may be adopted to drive the correcting lens 40.

Figure 10:
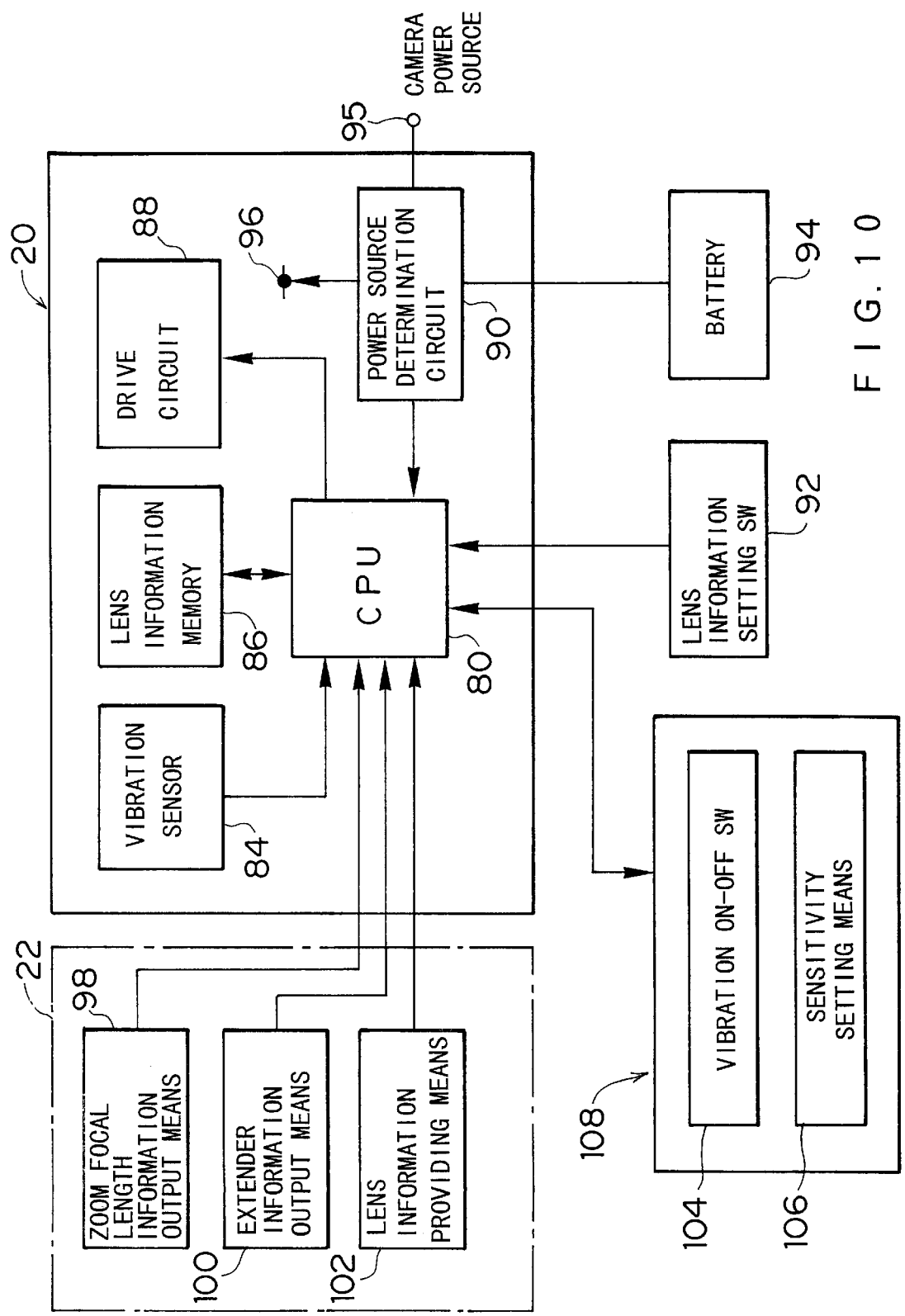
FIG. 10 is a block diagram showing the entire structure of the vibration isolator.

FIG. 10 is a block diagram showing the entire structure of the vibration isolator 20. The vibration isolator 20 is comprised mainly of a vibration sensor 84, a lens information memory 86, a drive circuit 88, a supply power source determination circuit 90, the CPU 80, a lens information setting switch 92, and a battery 94. The vibration sensor 84 is equivalent to the angular velocity sensors 76, 78 in FIG. 9, and the drive circuit 88 is a generic name for a circuit that drives the correcting lens 40, and is equivalent to the amplifier 82, the linear motors 44, 46, or the like.

The battery 94 supplies the power to the vibration isolator 20. Alternatively, the power may be supplied from the camera 18 (not shown in FIG. 10) through a camera power input terminal 95 if the camera has extra power. The power source determining circuit 90 determines which power source should be used to supply the power to a power source terminal 96, so that the power source can be switched automatically between the battery 94 and the camera 18. If the power may be supplied from both the battery 94 and the camera, the battery 94 takes a priority.

The lens device 22 has a zoom focal length information output means 98, an extender information output means 100 and a lens information providing means 102. A sensor such as a potentiometer (not shown) regularly detects the zoom position (the currently-set focal length) of the lens device 22, and the information about the focal length is transmitted from the zoom focal length information output means 98 to the CPU 80 of the vibration isolator 20. The information (the extender information) indicating the state of the extender (the information indicating whether the extender is used or not, and the magnification of the extender) is transmitted from the extender information output means 100 to the CPU 80 of the vibration isolator 20.

The lens information providing means 102 provides the vibration isolator with information inherent to the lens device 22 (including the magnification of the lens). The lens information providing means 102 is, for example, a ROM that contains the lens inherent information. When the vibration isolator 20 is connected to the lens device 22, the lens inherent information is transmitted from the lens information providing means 102 to the CPU 80 of the vibration isolator 20. The information is stored in a lens information memory 86. The CPU 80 reads the data from the lens information memory 86 and does the calculation required for controlling the correcting lens 40.

The information stored in the lens information memory 86 can be updated using the lens information setting switch 92. The lens inherent information can freely be entered by operating the lens information setting switch 92. For this reason, the vibration isolator 20 can be applied to the lens device 22 that is not provided with the lens information setting means 102.

The vibration isolator 20 also connects to a controller (a remote control) 108 which has a vibration ON/OFF switch 104 for selecting the ON/OFF of a vibrating function and a sensitivity setting means 106 for adjusting the gain sensitivity of the vibration isolator 20. As is the case with the zoom control part and the focus control part, the controller 108 is disposed, for example, near a grip of a pan/tilt control rod so that the cameraman can manually operate the controller 108. The lens information setting switch 92 may be attached to the controller 108.

A description will now be given of how the vibration isolator for the TV camera connects to the lens device.

Since the adapter-type vibration isolator 20 is independent of the lens device 22, it must be constructed in such a way as to receive the information required for controlling the vibration isolation (the zoom focal length, the magnification of the extender, etc.) from the lens device 22.

Figure 11:
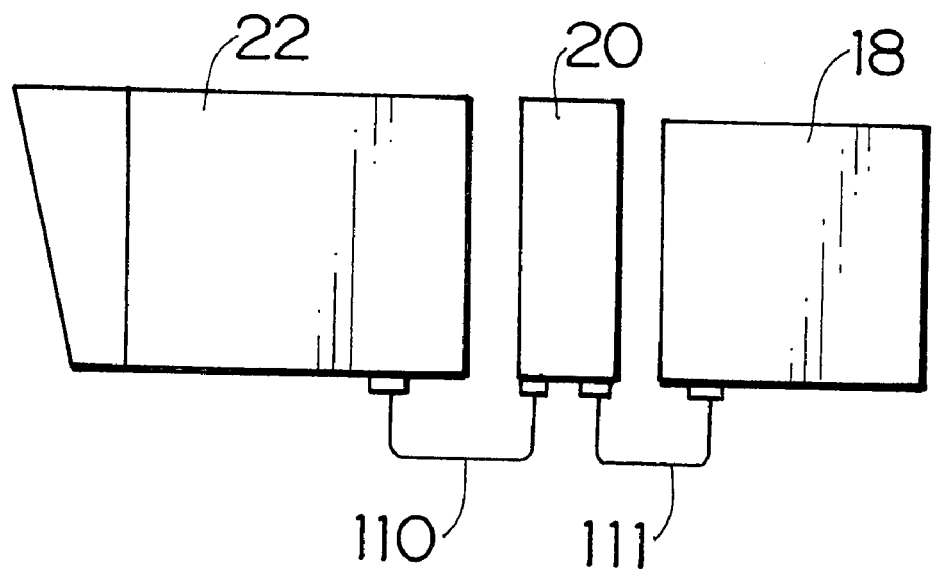
FIG. 11 is a conceptual view showing an example of the state wherein a vibration isolator connects to a lens device.

If the lens device 22 connects to the camera 18 through cables as shown in FIG. 11, the lens device 22 connects to the vibration isolator 20 through a cable 110, and the vibration isolator 20 connects to the camera 18 through another cable 111. Consequently, the data is transmitted from the lens device 22 to the vibration isolator 20 through the cable 110 and to the camera 18 through the cables 110, 111.

Figure 12:
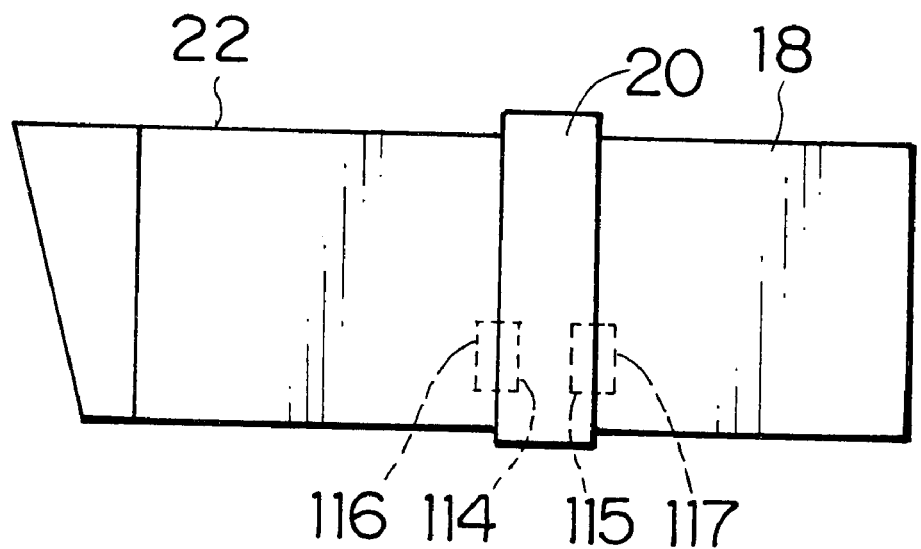
FIG. 12 is a conceptual view showing another example of the state wherein a vibration isolator connects to a lens device.

If the lens device 22 connects to the camera 18 in such a way that their mount faces are hooked, connectors 114, 115 are provided at suitable positions on the front and back faces of the vibration isolator 20 as shown in FIG. 12. When the vibration isolator 20 is mounted between the camera 18 and the lens device 22, a connector 116 on the back face of the lens device 22 is connected to the connector 114 on the front face of the vibration isolator 20, and a connector 117 on the front face of the camera 18 is connected to the connector 115 on the back face of the vibration isolator 20.

Figure 13:
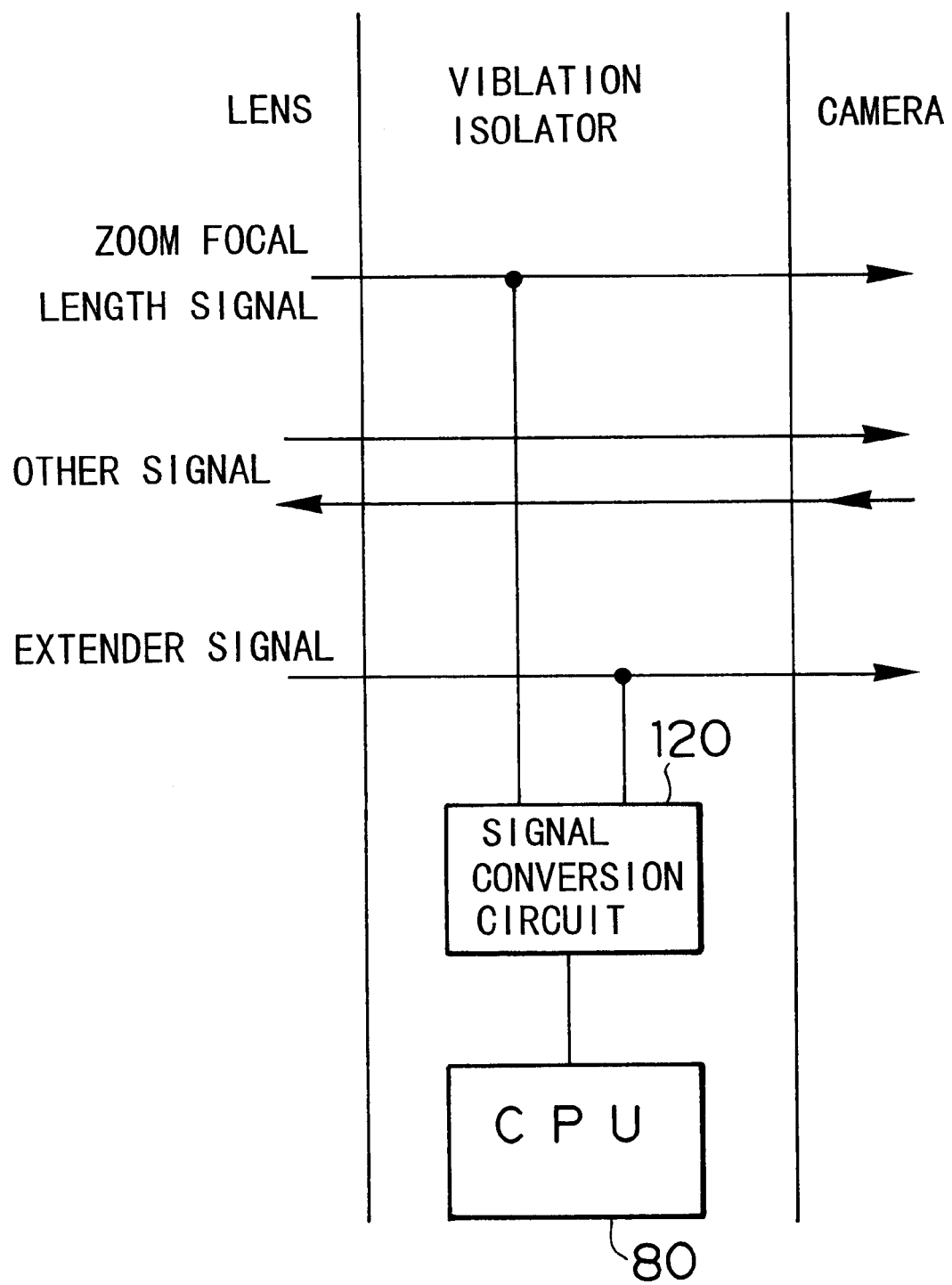
FIG. 13 is a conceptual view showing how to transfer a signal between the lens and the camera.

As described with reference to FIGS. 11 and 12, if the lens device 22 connects to the camera 18 across the vibration isolator 20 as shown in FIG. 13, the lens device 22 outputs a variety of signals in addition to the signal indicating the zoom focal length and the signal (EXT signal) indicating the state of the extender, and the camera 18 outputs control signals, etc. to the lens device 22.

Thus, the CPU 80 of the vibration isolator 20 receives only the signals (the signal indicating the zoom focal length and the EXT signal) required for controlling the vibration isolation through a signal conversion circuit 120, and the other signals pass through the vibration isolator 20.

Figure 14:
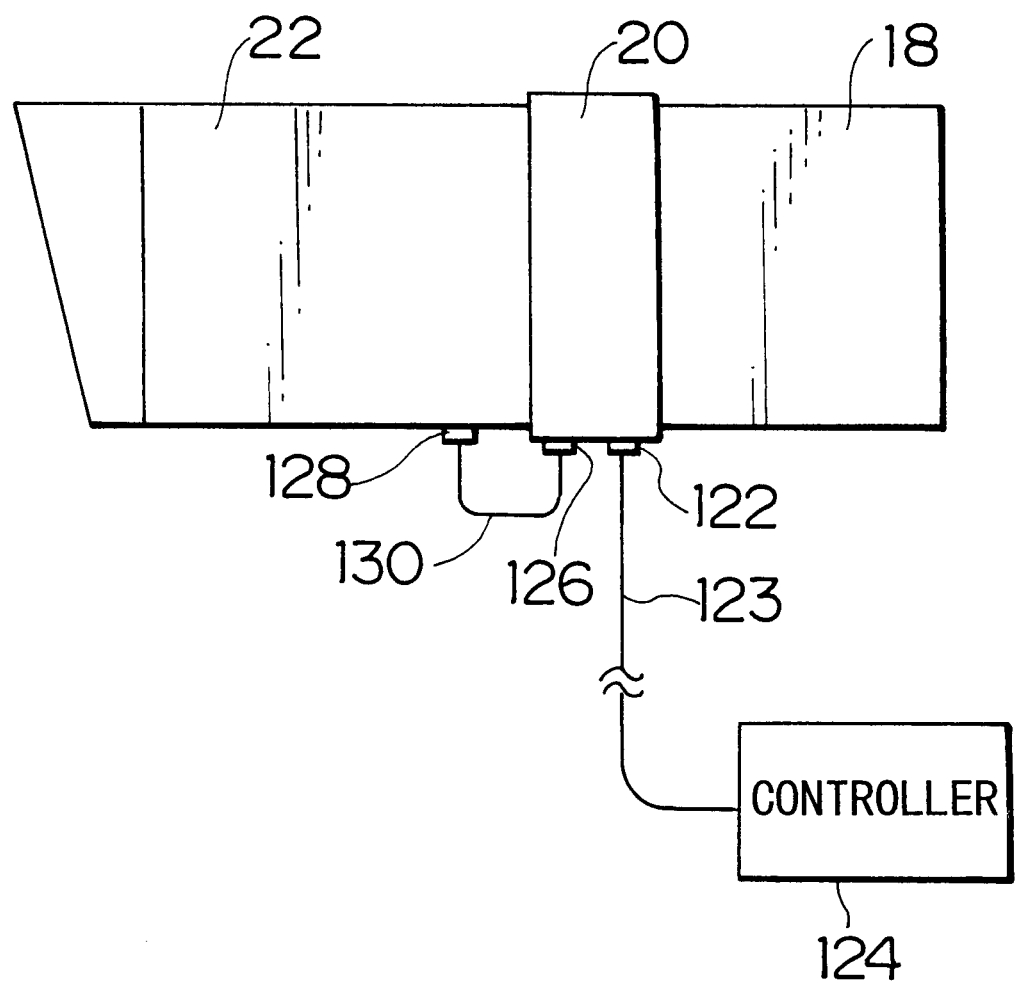
FIG. 14 is a conceptual view showing another example of the state wherein a vibration isolator connects to a lens device.

The interface between the camera and the lens includes no signal required for controlling the vibration isolation. In this case, as shown in FIG. 14, the outputs through the control line are processed. The vibration isolator 20 is provided with a connector 122, and the connector 122 is connected to a controller 124 through a cable 123. The controller 124 is not necessarily the controller 108 in FIG. 10, but it includes the lens information setting switch 92, the zoom control part, the focus control part (not shown), or the like.

The vibration isolator 20 is provided with a connector 126 for outputting a control signal. The connector 126 is connected to a connector 128 of the lens device 22 through a cable 130.

Accordingly, the vibration isolator 20 can control the vibration isolation using the lens inherent information, the zoom control signal, the focus control signal, the extender switch signal, etc. transmitted from the controller 124. The control signals output from the controller 124 are transmitted to the lens device 22 through the vibration isolator 20 and the cable 130, so that the lens device 22 can be controlled in accordance with the operation of the cameraman.

A description will now be given of the operation of the vibration isolator for the TV camera.

The lens device 22 is mounted in the mount frame 17 of the lens supporter 16, and the vibration isolator 20 is attached to the back face of the mount frame 17. The camera 18 is disposed at the back of the vibration isolator 20. When they are connected electrically, the lens information providing means 102 of the lens device 22 transmits the lens inherent information to the CPU 80 of the vibration isolator 20. The CPU 80 stores the transmitted lens inherent information in the lens information memory 86 for use in the calculation required for controlling the vibration.

The information stored in the lens information memory 86 can be changed freely using the lens information setting switch 92. It is possible to set the lens inherent information by the lens information setting switch 102 even if the attached lens device is not provided with the lens information providing means 102.

Figure 15:
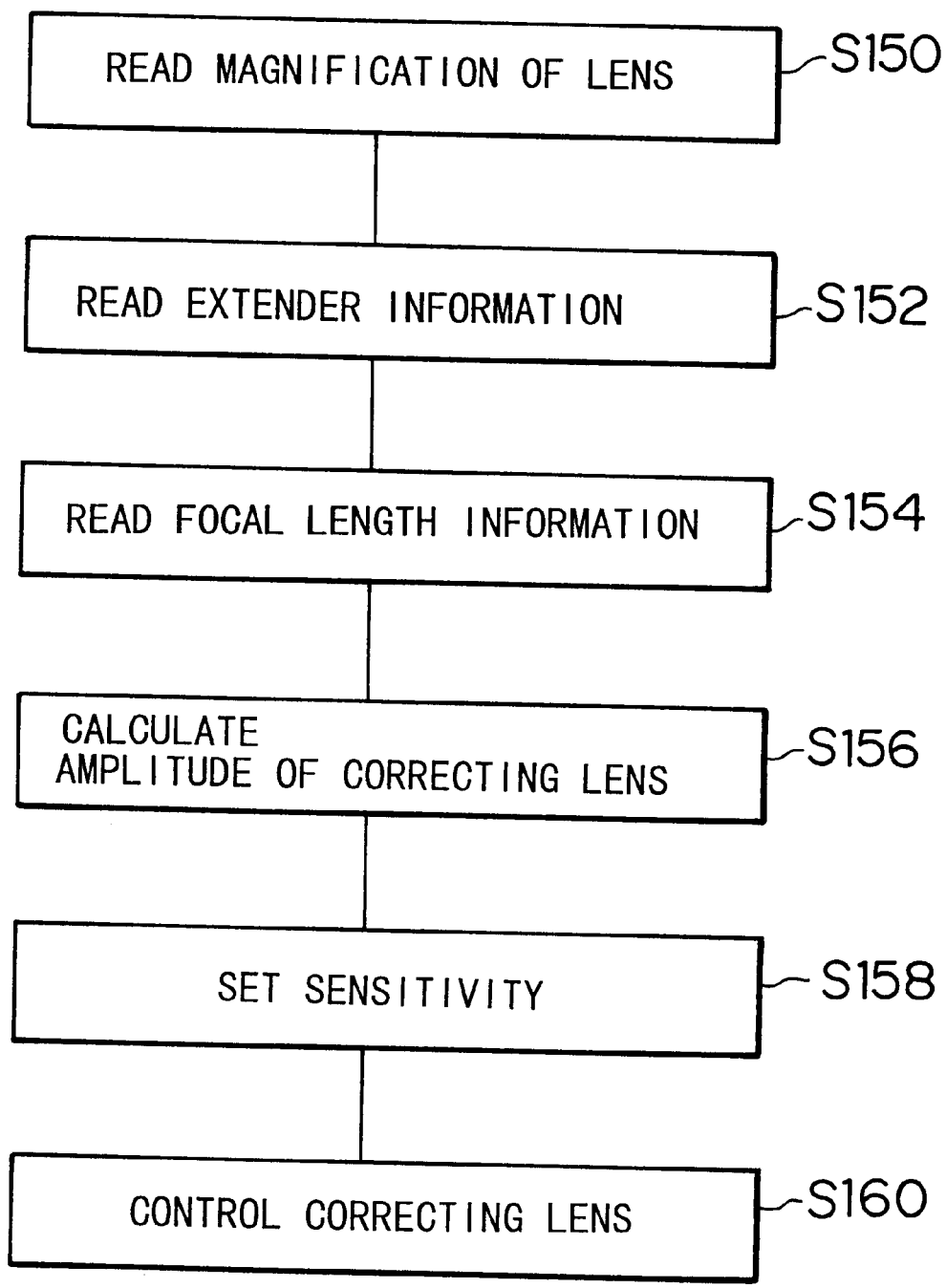
FIG. 15 is a flow chart showing the vibration isolation controlling procedure of a CPU in the vibration isolator in FIG. 10.

FIG. 15 shows how the CPU 80 of the vibration isolator 20 controls the vibration isolation. First, the CPU 80 reads the magnification of the lens from the lens information memory 86 (step S150). Then, the CPU 80 reads the extender information from the lens device 22 (step S152) and reads the zoom focal length (step S154).

The CPU 80 calculates the amplitude of the correcting lens 40 in accordance with the read information (step S156). Then, the CPU 80 sets the gain sensitivity of the vibration sensor 84 in accordance with the settings of the sensitivity setting means 106 (step S158). In this state, the CPU 80 waits for the vibration sensor 84 to detect the vibrations. When the vibration sensor 84 detects the vibration of the lens, the CPU 80 calculates the driving direction and the driving amount (the correcting amount) for the correcting lens 40, and drives the correcting lens 40 by the calculated correcting amount (step S160). The linear motors 44, 46 operate according to the vibration of the lens, and the correcting lens 40 moves in such a way as to correct the image blur within a plane perpendicular to the optical axis L.

As stated above, the adapter-type vibration isolator 20 is freely attached to and detached from the lens supporter 16, and the vibration isolator 20 can be used for different kinds of lens devices. Therefore, the cost of the lens device 22 is substantially lower than that of the lens device which has the built-in vibration isolator.

Particularly in this embodiment, the vibration isolator 20 is attached to the back face of the mount frame 17 of the lens frame 16 regardless of the shapes of the hook mounts of the lens and the lens supporter.

Additionally, the vibration isolator 20 of this embodiment automatically checks the lens information relating to the attached lens device 22 and adjusts the amplitude of the correcting lens with respect to the vibrations of the lens.

In this embodiment, the adapter-type vibration isolator is used, but the vibration isolator may be built in the lens supporter.

As set forth hereinabove, according to the present invention, the vibration isolator is attached to the lens supporter, and the vibration isolator used for different kinds of lens devices. This reduces the manufacturing cost for the lens device.

Particularly, the adapter-type vibration isolator is attached to the back face of the mount frame of the lens supporter regardless of the shapes of the hook mounts of the lens and the lens supporter.

In accordance with the alternate embodiment of the present invention, the vibration isolator is provided with the information input control part for setting the lens inherent information. Thus, the user can freely enter and change the lens inherent information through the information input control part. Moreover, the vibration isolator can properly control the vibration isolation even if it receives no lens inherent information from the lens device.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A vibration isolator for a TV camera, in which a lens device is attached to a body thereof across a mounting frame of a lens supporter, the lens supporter being fixed to a pan head connected to a tripod and said TV camera is fixed to one side of the lens supporter and the lens device is fixed to the other side of the lens supporter, wherein said vibration isolator provided with a correcting lens for correcting an image blur of said TV camera is provided on said lens supporter.

2. The vibration isolator for the TV camera as defined in claim 1, wherein said vibration isolator is an adapter-type vibration isolator detachably attached to the back side of a mount frame of said lens supporter through connecting means.

3. The vibration isolator for the TV camera as defined in claim 1, wherein said vibration isolator comprises:

said correcting lens;

supporting means for movably supporting said correcting lens within a plane perpendicular to an optical axis;

image blur detecting means for detecting the image blur of said TV camera;

an arithmetic unit for calculating a correction movement amount for said correcting lens in accordance with information from said image blur detecting means;

drive means for moving said correcting lens in such a direction as to correct the image blur in accordance with information from said arithmetic unit;

position detection means for detecting the position of said correcting lens; and control means for feedback-controlling said drive means so that said correcting lens can be moved by the correction movement amount calculated by said arithmetic unit in accordance with the position of the correcting lens detected by said position detecting means.

4. The vibration isolator for the TV camera as defined in claim 2, wherein said vibration isolator comprises:

said correcting lens;

supporting means for movably supporting said correcting lens within a plane perpendicular to an optical axis;

image blur detecting means for detecting the image blur of said TV camera;

an arithmetic unit for calculating a correction movement amount for said correcting lens in accordance with information from said image blur detecting means;

drive means for moving said correcting lens in such a direction as to correct the image blur in accordance with information from said arithmetic unit;

position detection means for detecting the position of said correcting lens; and control means for feedback-controlling said drive means so that said correcting lens can be moved by the correction movement amount calculated by said arithmetic unit in accordance with the position of the correcting lens detected by said position detecting means.

5. The vibration isolator for the TV camera as defined in claim 1, wherein said vibration isolator includes amplitude adjusting means for adjusting the amplitude of said correcting lens for each lens device in accordance with lens information transmitted from each lens device.

6. The vibration isolator for the TV camera as defined in claim 2, wherein said vibration isolator includes amplitude adjusting means for adjusting the amplitude of said correcting lens for each lens device in accordance with lens information transmitted from each lens device.

7. The vibration isolator for the TV camera as defined in claim 1, wherein said vibration isolator includes information input control part for setting lens information in accordance with the operation of a user.

8. The vibration isolator for the TV camera as defined in claim 2, wherein said vibration isolator includes information input control part for setting lens information in accordance with the operation of a user.

9. The vibration isolator for the TV camera as defined in claim 1, wherein said vibration isolator includes a remote control part provided with vibration isolation ON/OFF control means for determining whether to operate a vibration isolating function of said vibration isolator and/or sensitivity adjustment control means for adjusting the sensitivity of image detecting means for detecting the blur of said TV camera.

10. The vibration isolator for the TV camera as defined in claim 2, wherein said vibration isolator includes a remote control part provided with vibration isolation ON/OFF control means for determining whether to operate a vibration isolating function of said vibration isolator and/or sensitivity adjustment control means for adjusting the sensitivity of image detecting means for detecting the blur of said TV camera.

11. The vibration isolator for the TV camera as defined in claim 1, wherein said vibration isolator has a built-in battery, which drives said vibration isolator.

12. The vibration isolator for the TV camera as defined in claim 1, wherein said vibration isolator has a camera power source input terminal, which connects to the body of said TV camera so as to supply power to said vibration isolator from the body of said TV camera.

13. The vibration isolator for the TV camera as defined in claim 3, wherein said support means for supporting said correcting lens is a parallel link mechanism.

14. The vibration isolator for the TV camera as defined in claim 4, wherein said support means for supporting said correcting lens is a parallel link mechanism.

15. The vibration isolator for the TV camera as defined in claim 3, wherein said drive means for moving said correcting lens is a linear motor.

16. The vibration isolator for the TV camera as defined in claim 4, wherein said drive means for moving said correcting lens is a linear motor.

* * * * *